United States Patent
Schultz et al.

(10) Patent No.: US 9,636,573 B1
(45) Date of Patent: May 2, 2017

(54) SYSTEM AND METHOD FOR PROVIDING VIRTUAL ITEMS TO USERS OF A VIRTUAL WORLD

(71) Applicant: KABAM, INC., San Francisco, CA (US)

(72) Inventors: Stephanie K. Schultz, San Francisco, CA (US); Michael C. Caldarone, Palo Alto, CA (US)

(73) Assignee: Kabam, Inc., San Francisco, CA (US)

( * ) Notice: Subject to any disclaimer, the term of this patent is extended or adjusted under 35 U.S.C. 154(b) by 389 days.

(21) Appl. No.: 14/165,558

(22) Filed: Jan. 27, 2014

(51) Int. Cl.
*A63F 9/24* (2006.01)
*A63F 13/00* (2014.01)
*G06F 17/00* (2006.01)
*G06F 19/00* (2011.01)
*A63F 13/30* (2014.01)

(52) U.S. Cl.
CPC .................... *A63F 13/12* (2013.01)

(58) Field of Classification Search
CPC ...... A63F 13/49; A63F 13/493; A63F 13/497; A63F 2300/5533; A63F 2300/554; A63F 2300/636; G07F 17/3255
See application file for complete search history.

(56) References Cited

U.S. PATENT DOCUMENTS

| 9,356,829 | B1 * | 5/2016 | Zeldin ................. H04L 41/0654 |
| 2009/0029676 | A1 | 1/2009 | Thalapaneni et al. ........ 455/411 |
| 2009/0234948 | A1 | 9/2009 | Garbow et al. ............... 709/225 |
| 2010/0255901 | A1 * | 10/2010 | Garvey .................. G07F 17/32 463/25 |

FOREIGN PATENT DOCUMENTS

| EP | 2437224 | 4/2012 |
| WO | 00/25876 | 5/2000 |

* cited by examiner

*Primary Examiner* — Milap Shah
*Assistant Examiner* — Jason Pinheiro
(74) *Attorney, Agent, or Firm* — Sheppard Mullin Richter & Hampton LLP

(57) ABSTRACT

A shop interface is presented to users in conjunction with presentation of views of an online game, wherein the shop interface is configured to facilitate presentations to users of offers to sell virtual items usable within the game in exchange for consideration. In response to detecting that the online game is systematically unavailable to users, an alternative virtual shop interface is presented to users that is accessed over the Internet separately from the online game, and offers to sell the virtual times usable within the game are presented to users in exchange for less consideration than the offers to sell the virtual items through the shop interface presented in conjunction with the online game.

18 Claims, 5 Drawing Sheets

SYSTEM AND METHOD FOR PROVIDING VIRTUAL ITEMS TO USERS OF A VIRTUAL WORLD

FIELD OF THE DISCLOSURE

This disclosure relates to providing virtual items to users of a virtual world, and in particular, providing virtual items to users of an online game when the online game is systematically unavailable.

BACKGROUND

Applications, including online games, may be systematically unavailable. Such systematic unavailability may include circumstances when the application is taken offline for routine maintenance (e.g., when the server is taken offline) or when the application is unexpectedly unavailable (e.g., when the application server crashes).

When applications are offline those applications cannot generate revenue from users. Additionally, some users may never return to the application, such as an online game, and the opportunity to generate from those users may be forever lost.

SUMMARY

One aspect of the disclosure relates to providing an alternative virtual shop interface to users of an online game that would be triggered by an indication that the online game is systematically unavailable. In the alternative virtual shop interface, users may purchase virtual items (e.g., virtual goods, virtual resources, virtual currency, and/or other virtual items) usable within the online game. The alternative virtual shop interface may be accessed separately from the online game. For example, the alternative virtual shop interface may be accessed through a separate server from the online game. The alternative virtual shop interface may be provided when the online game server is systematically unavailable. For example, the online game server(s) may be unavailable due to being taken offline for maintenance, when the online game server is offline unexpectedly, such as when the online game server has crashed, and/or at other times.

In some implementations, the alternative virtual shop interface may comprise a separate payment system compared to the virtual shop interface accessible through the online game. In some implementations, users may utilize resource or currency balances held in their game accounts even while the online game server is unavailable. The alternative virtual shop interface may offer discounted prices for virtual items compared to the virtual shop interface accessible through the online game. Offering discounted rates may provide the user with a positive experience while the online game is systematically unavailable.

Administrator-selected parameters may be used to configure the alternative virtual shop interface. For example, certain administrator-parameters may include an indication of the type of virtual item available for purchase through the alternative virtual shop, the associated user cost for the virtual items, when the alternative virtual shop is available to users, and/or other parameters associated with the alternative virtual shop.

The alternative virtual shop interface may include a notification of the discounted rates for the virtual items offered through the alternative virtual shop compared to the virtual shop accessible through the online game, providing an incentive to users to purchase virtual items.

Upon an indication that the online game server(s) has become available, the virtual items purchased by the users through the alternative virtual shop may become available to the users in the online game, such that the virtual items purchased through the alternative virtual shop interface by users are reconciled with inventories of virtual items available to users in the online game. For example, the server(s) providing access to the online game may be configured to reconcile user accounts with those associated with the server(s) providing the alternative virtual shop interface upon an indication that the online game has become available.

In some implementations, the virtual shop interface may be available to users matching a set of defined parameters. For example, Server(s) providing the alternative virtual shop may be configured to provide the alternative virtual shop to users having met and/or exceeded a threshold progress value when the online game is systematically unavailable. Server(s) providing the alternative virtual shop may be configured to provide the alternative virtual shop to users having an indication that they have purchased in excess of a threshold amount of virtual currency and/or spent in excess of a threshold amount of real world currency in the online game may gain access to the alternative virtual shop interface when the online game is systematically unavailable, and configured to not provide the alternative virtual shop to those users who do not.

In some implementations, a system for providing virtual items to users of a virtual world may be provided that includes two or more servers. The server(s) may be configured to communicate with one or more client computing platforms according to a client/server architecture. The users of the system may access the system and/or a virtual space (e.g., a virtual world, a game space, an online game, etc.) via the client computing platforms.

The system for providing virtual items to users of a virtual world may comprise one or more physical processors configured by computer-readable instructions to perform various functions. The one or more physical processors may be configured to execute an instance of an online game, and to facilitate user participation in the online game by effectuating transmission of information related to the instance of the online game to client computing platforms on which views of the online game are presented to users. The one or more physical processors may be configured to effectuate presentation of a shop interface to users in conjunction with the presentation of views of the online game, wherein the shop interface is configured to facilitate presentations to users of offers to sell virtual items usable within the game in exchange for consideration. Such consideration may include an amount of real world currency and/or an amount of virtual currency exchanged by the user for virtual items.

The system may be configured to detect if the online game is systematically unavailable to users. The online game may be systematically unavailable to users when the game has been purposefully made unavailable to users by an administrator. For example, the online game and/or the one or more server(s) providing the online game may have been disabled by administrator(s) for maintenance. The online game may be systematically unavailable to users when the online game has been made unavailable to users due to a malfunction of the system. For example, the online game may be unavailable due to the malfunctioning of the server providing the online game, or the one or more connections between the client computing device and the server providing the online game being interrupted and/or other reasons for a malfunction of the system.

In response to detecting that the online game is presently systematically unavailable, the system may be configured to effectuate presentation of an alternative virtual shop interface to users. The alternative virtual shop interface may be accessed over the Internet separately from the online game. The alternative virtual shop interface may be configured to present to users offers to sell the virtual times usable within the game. As such, the system may be configured to present an alternative virtual shop interface to a first user in response to detection that the online game is presently systematically unavailable to the first user, wherein the alternative virtual shop interface may be accessed over the Internet by the first user separately from the online game.

The offers to sell virtual items may be provided in exchange for less consideration through the alternative virtual shop interface than the offers to sell the virtual items through the shop interface presented in conjunction with the online game, thereby incentivizing users to accept offers presented in the alternative virtual shop interface. In this manner, the online game being systematically unavailable to users of the online game may be a more positive experience for the users and avoid loss of users who would otherwise not return to the online game.

The offers presented through the shop interface associated with the online game may include a first offer to sell a first set of one or more virtual items for a first consideration amount, and the offers presented through the alternative virtual shop interface may include a second offer to sell the first set of one or more virtual items for a second consideration amount that is less than the first consideration amount. As such the first offer to sell virtual items to the first user through the alternative virtual shop interface may have a second consideration amount that is less than the first consideration amount of the offer to sell virtual items provided to the first user through the shop interface associated with the online game. In this manner, the user may be incentivized to accept the second offer when the online game is systematically unavailable, thereby generating revenue for the online game provider when the online game is systematically unavailable.

The virtual items purchased through the alternative virtual shop interface may become available to a purchaser once the online game becomes available. For example, where the online game is provided by an online game server and the alternative virtual shop interface is provided by an alternative virtual shop server, the user account associated with the online game and managed by the online game server is reconciled with the virtual items purchased by the user through the alternative virtual shop interface, such that the virtual items purchased by the user through the alternative virtual shop interface become available to the user in the online game.

The one or more physical processors may be configured by computer-readable instructions to redirect the view presented on the client computing device and/or provide a link on the client computing device to the alternative virtual shop interface in response to detecting that the game is systematically unavailable. The view presented to the first user through the client computing device associated with the first user may be automatically redirected to the alternative virtual shop interface upon a determination that the online game is systematically unavailable to the first user. The view presented to the first user through the client computing device associated with the first user may be of a link to the alternative virtual shop interface wherein the user may select and/or enter an indication of a desire to be directed to the alternative virtual shop interface.

The one or more physical processors may be configured by computer-readable instructions to facilitate entry and/or selection of one or more parameters associated with the one or more sets of virtual items, by an administrator. The one or parameters may include the consideration amount associated with the virtual items. The system may be configured to facilitate entry by the administrator of a consideration amount for the one or more offers for the sale of virtual items through the alternative virtual shop interface. The consideration amount for the offer to sell virtual items through the alternative virtual shop interface may be a defined amount, or may be a set percentage of the consideration amount for the offer to sell the same or similar virtual items through the shop interface associated with the online game.

The virtual items of the offers to sell virtual items may include virtual items usable by users in the online game. The virtual items of the offers to sell virtual items may include virtual currency usable by the users in the virtual space.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
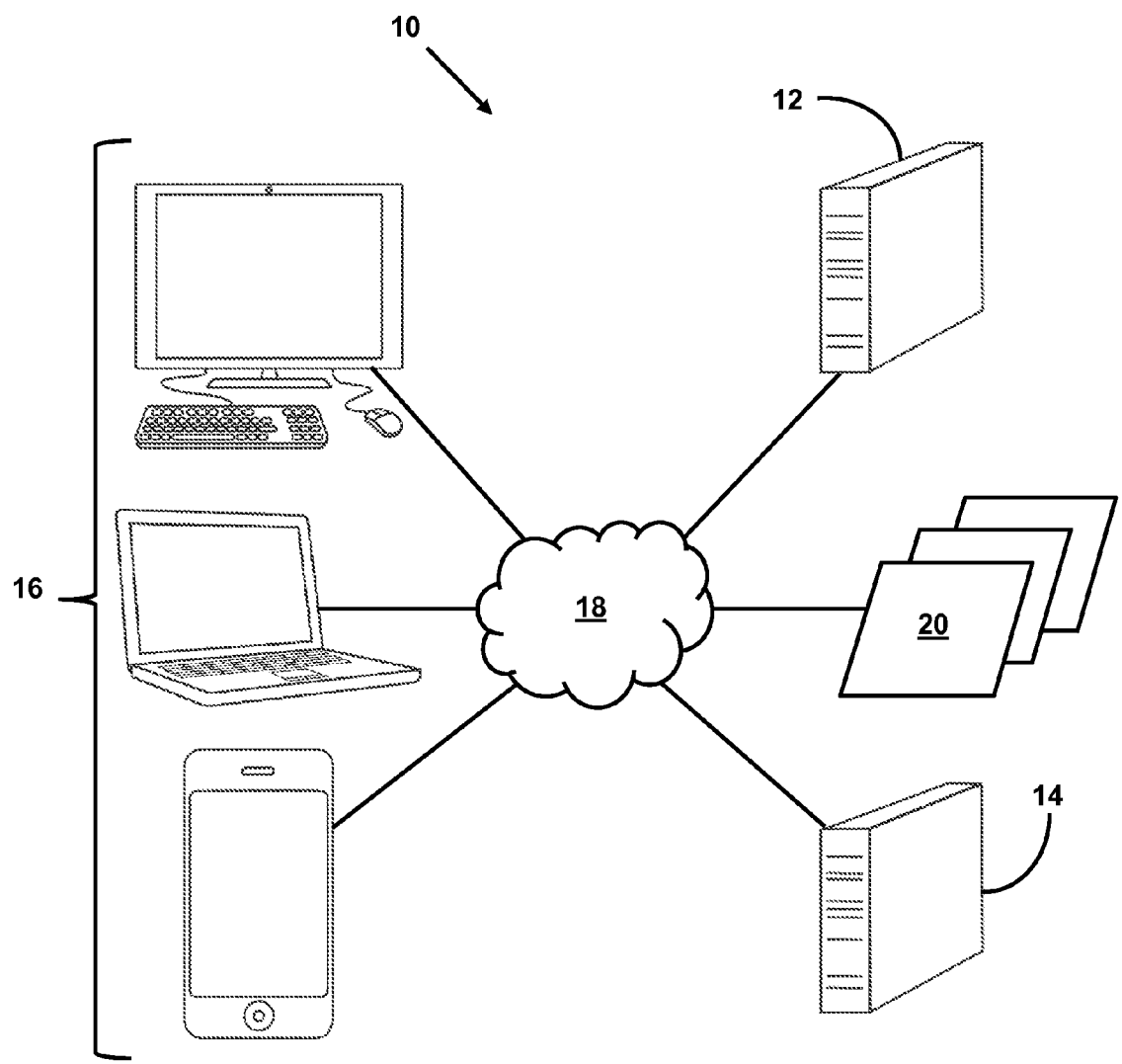
FIG. 1 illustrates a system for providing virtual items to users of a virtual world, in accordance with one or more implementations.

FIG. 1 illustrates a system 10 for providing virtual items to users of a virtual world. The system may comprise a first server 12 and a second server 14. The first server 12 may be configured to provide an online game in a virtual space to users of the system 10 through client computing platforms 16 associated with the users. The second server 14 may be configured to provide other services and/or experiences to users of the system 10. For example, second server 14 may be an alternative virtual shop server providing users the ability to purchase virtual items outside of the online game provided by the first server 12. The second server 14 may be configured to provide information about the online game and/or one or more users of the online game, such as statistical information, a level of progress, and/or one or more game metrics without the user having to log into the online game. The servers 12, 14 may be configured to communicate with each other and/or one or more client computing platforms 16 according to one or more client/server architectures.

Providing the virtual space may include hosting the virtual space over a network 18. In some implementations, system 10 may include one or more virtual space servers 12, one or more system servers 14, and/or other components. The virtual space, or online game, server 12 may be configured to communicate with one or more client computing platforms 16 according to a client/server architecture to provide the virtual space to users via the client computing platforms 16. The second server 14 may be configured to communicate with the client computing platforms 16 upon an indication that the online game is systematically unavailable to the users.

Figure 2:
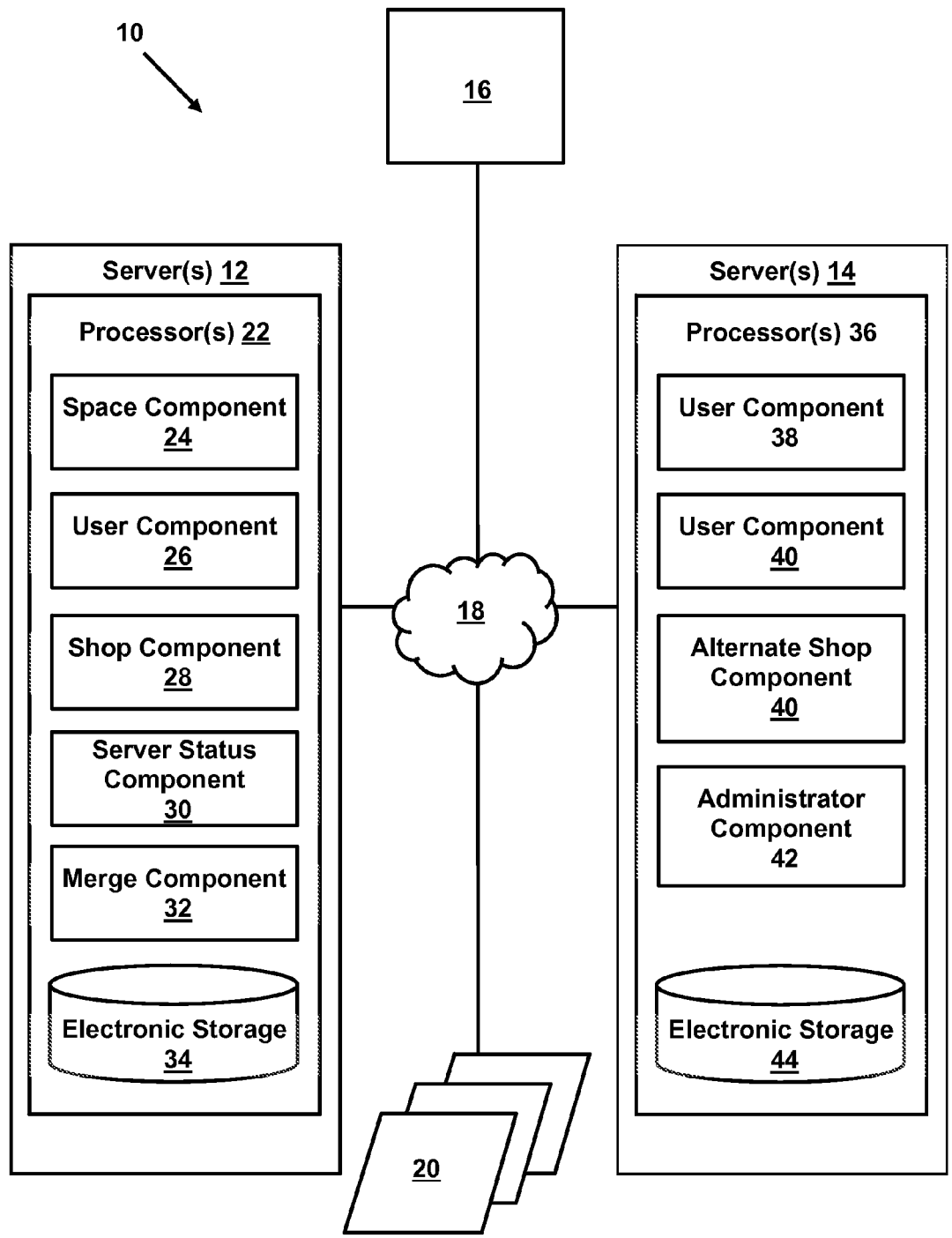
FIG. 2 illustrates a virtual shop interface associated with an online game, in accordance with one or more implementations.

With reference to FIG. 2, the servers 12, 14 may be configured to execute one or more computer program components. The computer program components may include one or more of a virtual space component 24, a user component 26, a shop component 28, a server status component 30, a merge component 32, an alternative user component 38, an alternative shop component 40, an administrator component 42 and/or other components.

The user component 26 may be configured to access and/or manage one or more user profiles and/or user information associated with users of the system 10. For example, user component 26 may be configured to manage a first user account associated with a first user, and a second user account associated with a second user. The one or more user profiles and/or user information may include information stored by server 12, server 14, one or more of the client computing platforms 16, one or more third party resources 20, and/or other storage locations. The user profiles may include for example, information identifying users (e.g., a username or handle, a number, an identifier, and/or other identifying information) within the virtual space and/or online game, security login information (e.g., a login code or password), virtual space and/or online game account information, subscription information, virtual currency account information (e.g., related to currency held in credit for a user), relationship information (e.g., information related to relationships between users in the virtual space), virtual space and/or online game usage information, demographic information associated with users, interaction history among users in the virtual space and/or online game, information stated by users, purchase information of users, browsing history of users, a client computing platform identification associated with a user, a phone number associated with a user, and/or other information related to users.

The space component 24 may be configured to implement the instance of the virtual space executed by the computer components to determine state of the virtual space. The state may then be communicated (e.g., via streaming visual data, via object/position data and/or other state information) from server 12 to client computing platforms 16 for presentation to users. The space component 24 may be configured execute an instance of an online game playable in the virtual space, and to facilitate user participation in the online game by effectuating transmission of information related to the instance of the online game to client computing platforms 16 on which views of the online game are presented to users. Transmission of the state may be accomplished via network 18. The state determined and transmitted to a given client computing platform 16 may correspond to a view for a user character in an online game being controlled by a user via the given client computing platform 16. The state determined and transmitted to a given client computing platform 16 may correspond to a location in the virtual space and/or online game. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space and/or online game may comprise a simulated space that is accessible by users via clients (e.g., client computing platforms 16) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous and/or semi-synchronous.

The above description of the manner in which state of the virtual space and/or online game is determined by space component 24 is not intended to be limiting. Furthermore, the use of virtual space and online game is not intended to be limiting. Both terms may be used either separately or interchangeably and may refer to consistent or inconsistent items and/or concepts. The space component 24 may be configured to express the virtual space and/or online game in a more limited or more rich manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place beyond the relatively generic graphics. For example, a view may include a generic battle graphic with a textual description of the opponents to be confronted. Other expressions of individual places within the virtual space are contemplated.

Within the instance(s) of the virtual space and/or game executed by space component 24, users may control characters, objects, simulated physical phenomena (e.g., wind, rain, earthquakes, and/or other phenomena) and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 16. The users may interact with each other through communications exchanged within the virtual space. Such communications may include one or more of textual chat, instant messages, private messages, voice communications and/or other communications. Communications may be received and entered by the users via their respective client computing platforms 16. Communications may be routed to and from the appropriate users through one or more servers 12 (e.g., through space component 24).

The instance of the virtual space and/or the game that takes place therein may be persistent. That is, the virtual space and/or the game may continue on whether or not individual players are currently logged in and/or participating in the game. A player that logs out of the virtual space and then logs back in some time later may find the virtual space has been changed through the interactions of other players with the virtual space during the time the player was logged out. These changes may include changes to the simulated physical space, changes in the player's inventory, changes in other player's inventories, changes experienced by non-player characters, and/or other changes.

Figure 3:
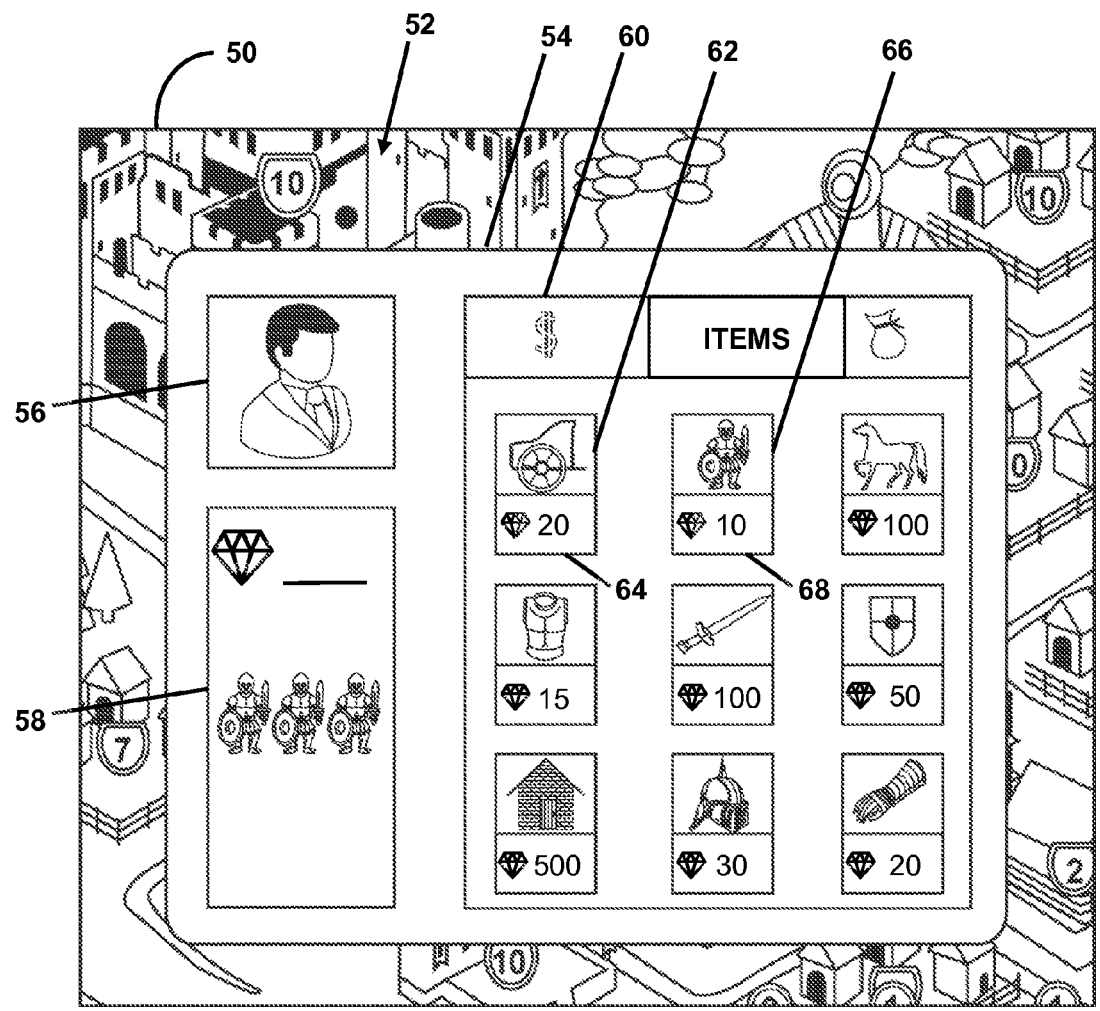
FIG. 3 illustrates an alternative virtual shop interface, in accordance with one or more implementations.

The shop component 28 may be configured to effectuate presentation of a shop interface to users in conjunction with presentation of views of the online game, wherein the shop interface is configured to facilitate presentations to users of offers to sell virtual items usable within the game in exchange for consideration. Such consideration may include an amount of real world currency and/or an amount of virtual currency. The consideration may be exchanged, by the user, for the virtual items. FIG. 3 illustrates a user interface 50 presented to users on one or more client computing platforms 16 (as shown in FIGS. 1 and 2), provided by the game server(s) 12. The user interface 50 may provide a representation of an online game 52 to the user. Within the representation of the online game 52 a user may cause entry and/or selection of an indication of a desire to enter the virtual shop interface 54. In response to an interaction by the user of the online game 52, the shop component 28 may be configured to effectuate presentation of a shop interface 54 to users in conjunction with presentation of views of the online game wherein the shop interface 54 is configured to facilitate presentations to users of offers to sell virtual items usable within the game in exchange for consideration. The presentation to users of offers to sell virtual items may comprise an indication of the virtual item 62 and an indication of the consideration 64 the user is required to exchange for the virtual item. For example, virtual item 62 is offered in the virtual shop 60 for an amount of consideration 64 equal to 10 gems. Virtual item 66 is offered to users in the virtual shop for an amount of consideration 68 equal to 40 gems. Virtual currency may take any form, for example, virtual currency may in the form of gems, stones, metals, credits, dollars, and/or any other representation of a virtual currency. The virtual shop component 28 may be configured to present offers for the sale of virtual items for consideration in the form of real currency. For example, the shop component 28 may be configured to facilitate the presentation of offers to exchange real currency for virtual currency usable by the users in the online game.

Within the presentation of the virtual shop interface 54, user information may be provided such as identifying information 56 of the user and one or more attributes and/or game play metrics 58 of the user. For example, one or more attributes and/or game play metrics 58 of the user may comprise an indication of the amount of virtual currency held in credit for the user, an indication of the inventory of the user, an indication of levels of one or more parameters of the user, such as strength, speed, skill, power, special abilities and/or other parameters. The shop interface 54 may comprise one or more tabs 60. Tabs 60 may be panels, views, control buttons and/or other graphical representations of one or more groupings within the virtual shop. One tab 60 may be a tab indicating that the user may obtain virtual currency for using in the online game 52, other tabs may include virtual items that are usable in the online game by the user. Virtual items usable in the online game may be broken further by category or type, such as weapons, tools, clothing, food, resources and/or other virtual item categories within the virtual space and/or online game 52. When the shop component 28 is causing the virtual shop interface 54 to present offers to users to sell virtual currency in exchange for consideration, wherein the consideration is an amount of real currency, the shop component 28 may be supported by an e-commerce component configured to facilitate obtaining real world currency from the users for the online game provider.

The system 10 may be configured to detect if the online game 52 is systematically unavailable to users. The online game 52 may be systematically unavailable to users when the game 52 has been purposefully made unavailable to users by an administrator. For example, the online game 52 and/or the one or more servers 12 providing the online game may have been disabled by one or more administrators for maintenance. The online game 52 may be systematically unavailable to users when the online game has been made unavailable to users due to a malfunction of the system 10 and/or game server(s) 12. For example, the online game 52 may be unavailable due to the game server 12 providing the online game having a malfunction or the one or more connections between the client computing device 16 and the game server 12 providing the online game 52 being interrupted and/or other reasons.

The system 10 and/or server status component 30 may be configured to detect that the online game is presently systematically unavailable. In response to detecting that the online game is presently systematically unavailable, the system 10 and/or the server status component 30 may be configured to direct client computing platforms 16 associated with users of the online game to communicate with an alternative server, such as alternative server 14. The alternative server 14 may have one or more processors 36 configured to execute one or more computer program components. For example, the one or more processors 36 of the alternative server(s) 12 may be configured to effectuate execution of an alternative user component 38, an alternative shop component 40, an administrator component and/or one or more other components. The alternative server 14 and the one or more associated processors 34 may be configured to execute one or more computer programs in the same or similar manner as the game server 12.

Figure 4:
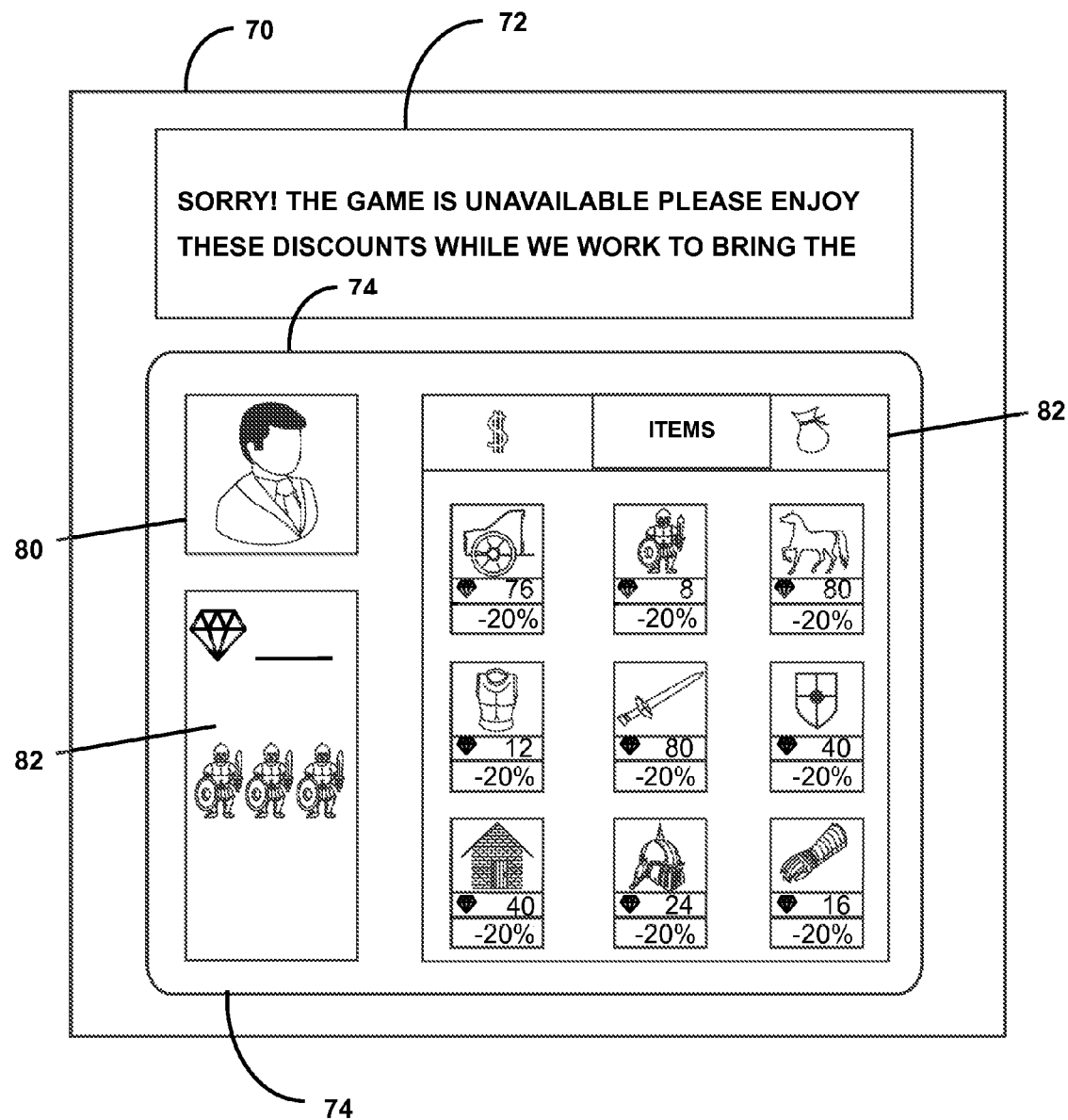
FIG. 4 illustrates a method for providing virtual items to users of a virtual world, in accordance with one or more implementations.

FIG. 4 is an illustration of an alternative interface 70 in accordance with one or more implementations. In response to a determination that the online game 52 is systematically unavailable to users, the alternative shop component 40 may be configured to effectuate presentation of an alternative interface 70 such as an alternative virtual shop interface 74 to users. The alternative interface 70 and/or alternative virtual shop interface 74 may be accessed over a network 18, such as the Internet, separately from the online game 52. In the alternative virtual shop interface 70, users may purchase virtual items (e.g., virtual goods, virtual resources, virtual currency, and/or other virtual items) usable within the online game. The alternative interface 70 may be configured to present a notification 72 to users. The notification 72 may present information to the users that the online game is currently systematically unavailable. The notification 72 may present information to users of a discount and/or reduction in the amount of consideration required to be exchanged for the virtual items, thus providing a positive experience when the online game is systematically unavailable. The notification 72 may present information to users of additional types of virtual items available through the alternative virtual shop interface 74 that are unavailable through the shop interface 54. In some implementations, users may utilize resource or currency balances held in their game accounts even while the online game server is unavailable to accept one or more of the offers presented through the alternative shop interface 74.

The alternative virtual shop interface 70 may be configured to present to users offers to sell the virtual items usable within the game. As such, the system 10 and/or alternative shop component 40 may be configured to present an alternative virtual shop 70 interface to a first user in response to detection that the online game 52 is presently systematically unavailable to the first user, wherein the alternative virtual shop interface 70 may be accessed over a network 18, such as the Internet, by the first user separately from the online game 52. The alternative virtual shop interface 70 may be configured to present an offer to sell virtual item 76 for an amount of consideration 78.

The offers to sell virtual items may be provided in exchange for less consideration through the alternative virtual shop interface 70 than the offers to sell the virtual items through the shop interface 54 presented in conjunction with the online game 52, thereby incentivizing users to accept offers presented in the alternative virtual shop interface. For example, virtual item 62 offered through the shop interface 54 for an amount of consideration 64 equaling twenty gems is offered through the alternative virtual shop interface as virtual item 76 for an amount of consideration equaling sixteen gems, thereby giving the user a 20% discount in the cost of the virtual item. The virtual shop interface 74 may comprise one or more discount notifications associated with offers to sell virtual items. For example, virtual item 76 having a consideration amount 78 less than consideration amount 64 for virtual item 62, wherein virtual items 76 and 62 are the same, may have an indication 86 of the difference between alternative consideration amount 78 and the consideration amount 64 when the game is available.

The alternative virtual shop interface 74 may be configured to provide offers to users to purchase virtual currency in exchange for an amount of consideration wherein the consideration is real world currency. Virtual currency obtained through the alternative virtual shop interface 74 may be provided at a discount compared to the virtual currency offered through the shop interface 54 in conjunction with the online game 52.

The offers presented through the shop interface 54 associated with the online game 52 may include a first offer to sell a first set of one or more virtual items 62 for a first consideration amount 64 and the offers presented through the alternative virtual shop interface 74 may include a second offer to sell the first set of one or more virtual items 76 for a second consideration amount 78 that is less than the first consideration amount 64. As such the second offer to sell virtual items 62 to the first user through the alternative virtual shop interface 74 may have a second consideration amount 78 that is less than the first consideration amount 62 of the offer to sell virtual items provided to the first user through the shop interface 54 associated with the online game 52. In this manner, the user may be incentivized to accept the second offer when the online game is systematically unavailable, thereby generating revenue for the online game provider when the online game is systematically unavailable.

The alternative virtual shop interface 74 may comprise the same elements as the shop interface 54 presented in conjunction with the online game 52. For example, the alternative virtual shop interface 74 may comprise information 80 about the user. User information may be provided such as identifying information 80 of the user and one or more attributes and/or game play metrics 82 of the user. For example, one or more attributes and/or game play metrics 82 of the user may comprise an indication of the amount of virtual currency held in credit for the user, an indication of the inventory of the user, an indication of levels of one or more parameters of the user, such as strength, speed, skill, power, special abilities and/or other parameters. The alternative virtual shop interface 74 may comprise one or more tabs 84. Tabs 84 may be panels, views, control buttons and/or other graphical representations of one or more groupings within the virtual shop. One tab 84 may be a tab indicating that the user may obtain virtual currency for using in the online game 52 Other tabs may include virtual items that are usable in the online game by the user. Virtual items usable in the online game may be broken further by category or type, such as weapons, tools, clothing, food, resources and/or other virtual item categories within the virtual space and/or online game 52. When the alternative shop component 40 is causing the virtual shop interface 74 to present offers to users to sell virtual currency in exchange for consideration, wherein the consideration is an amount of real currency, the alternative shop component 40 may be supported by an e-commerce component configured to facilitate obtaining real world currency from the users for the online game provider.

The alternative user component 38 may be configured to manage one or more alternative user accounts of the users of the online game. The alternative user accounts may be configured to store an inventory of the users of the online game. The alternative user accounts may comprise the same or similar information as the user accounts managed by the user component 26 described above. An indication of the virtual items purchased through the alternative virtual shop interface 74 may be stored in the alternative user accounts associated with the users managed by the alternative user component 38. For example, the alternative user accounts managed by the alternative user component 38 may include a first alternative account associated with a first user and a second alternative account associated with a second user.

The virtual items purchased through the alternative virtual shop interface 74 may become available to the user once the online game 52 is no longer systematically unavailable. For example, where the online game 52 is provided by an online game server 12 and the alternative virtual shop interface 74 is provided by an alternative server 14, the user account associated with the online game and managed by the online game server 12 may be reconciled with the virtual items purchased by the user through the alternative virtual shop interface 74, such that the virtual items purchased by the user through the alternative virtual shop interface become available to the user in the online game 52 once the online game 52 is no longer systematically unavailable.

While FIG. 2 illustrates the merge component 32 being initiated and implemented by the online game server 12, the merge component 32, may be implemented by one or more of the game server 12, the alternative server 14, client computing devices 16 and/or other computing components in the system 10. The functions of the merge component 32 may be performed by the user component 26, the alternative user component 38 and/or other components in any or all of the computing devices of system 10. The merge component 32 may be configured to reconcile the user accounts managed by the user component 26 with the alternative user accounts managed by the alternative user component 38. For example, upon an indication that the online game 52 is no longer systematically unavailable, the merge component 32 may update the first user account of the first user managed by the user component 26 with the virtual items obtained by the first user through the alternative virtual shop interface 74 and stored in the first alternative user account managed by the alternative user component 38.

While the online game is available to users, the merge component 32 may be configured to maintain the alternative user accounts managed by the alternative user component 38 updated with the information associated with the users of the online game. When the online game 52 is systematically unavailable a record of the current status of the user will be maintained in the alternative user accounts. In this manner, when the users are presented with the alternative virtual shop interface 74 they will have a complete, or nearly complete, record of status of their user accounts, enabling them to view their current inventories. Users may be able to exchange individual ones or groups of ones of virtual items in their inventories for other virtual items through the alternative virtual shop interface 74.

The one or more physical processors 22, 36 may be configured by computer-readable instructions to redirect the view presented on the client computing device 16 and/or provide a link on the client computing device 16 to the alternative virtual shop interface 74, in response to detecting that the online game 52 is systematically unavailable. The view presented to the first user through the client computing device 16 associated with the first user may be automatically redirected to the alternative virtual shop interface 74 upon a determination that the online game 52 is systematically unavailable to the first user. The view presented to the first user through the client computing device 16 associated with the first user may be of a link to the alternative virtual shop interface 74 wherein the user may select and/or enter an indication of a desire to be directed to the alternative virtual shop interface 74.

The one or more physical processors 22, 36 may be configured by computer-readable instructions and/or the administrator component 42 may be configured to facilitate entry and/or selection of one or more parameters associated with the one or more sets of virtual items by an administrator. The one or parameters may include the consideration amount associated with the virtual items. The system 10 and/or administrator component 42 may be configured to facilitate entry by the administrator of a consideration amount for the one or more offers for the sale of virtual items through the alternative virtual shop interface 74. The consideration amount for the offer to sell virtual items through the alternative virtual shop interface 74 may be a defined amount or may be a set percentage of the consideration amount for the offer to sell the same or similar virtual items through the shop interface associated with the online game. The virtual items of the offers to sell virtual items may include virtual items usable by users in the online game 52. The virtual items of the offers to sell virtual items may include virtual currency usable by the users in the online game 52.

The online game server 12, the alternative server 14, client computing platforms 16 and/or external resources 20 may be operatively linked via one or more electronic communication links. For example, such electronic communication links may be established, at least in part, via a network 18 such as the Internet and/or other networks. It will be appreciated that this is not intended to be limiting, and that the scope of this disclosure includes implementations in which servers 12 and 14, client computing platforms 16 and/or external resources 20 may be operatively linked via some other communication media.

A given client computing platform 16 may include one or more processors configured to execute computer program components. The computer program components may be configured to enable an expert or user associated with the given client computing platform 16 to interface with system 10 and/or external resources 20 and/or provide other functionality attributed herein to client computing platforms 16. By way of non-limiting example, the given client computing platform 16 may include one or more of a desktop computer, a laptop computer, a handheld computer, a tablet computing platform, a NetBook, a Smartphone, a gaming console, and/or other computing platforms.

The external resources 20 may include sources of information, hosts and/or providers of virtual environments outside of system 10, external entities participating with system 10 and/or other resources. In some implementations, some or all of the functionality attributed herein to external resources 20 may be provided by resources included in system 10.

The game server 12 may include electronic storage 34, one or more processors 22 and/or other components. The alternative server 14 may include electronic storage 44, one or more processors 34 and/or other components. The components of game server 12 may be the same or similar to the components of alternative server 14. The servers 12 and 14 may include communication lines, or ports to enable the exchange of information with a network 18 and/or other computing platforms. Illustration of servers 12 and 14 in FIG. 2 is not intended to be limiting. The servers 12 and 14 may include a plurality of hardware, software and/or firmware components operating together to provide the functionality attributed herein to servers 12 and 14. For example, servers 12 and 14 may be implemented by a cloud of computing platforms operating together as servers 12 and 14.

Electronic storage 34 and 44 may comprise electronic storage media that electronically stores information. The electronic storage media of electronic storage 34 and 44 may include one or both of system storage that is provided integrally (i.e., substantially non-removable) with servers 12 and 14 and/or removable storage that is removably connectable to servers 12 and 14 via, for example, a port (e.g., a USB port, a firewire port, etc.) or a drive (e.g., a disk drive, etc.). Electronic storage 34 and 44 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.) and/or other electronically readable storage media. The electronic storage 34 and 44 may include one or more virtual storage resources (e.g., cloud storage, a virtual private network and/or other virtual storage resources). Electronic storage 34 and 44 may store software algorithms, information determined by processors 22 and 36, information received from servers 12 and 14, information received from client computing platforms 16, and/or other information that enables servers 12 and 14 to function as described herein.

Processor(s) 22 and 36 are configured to provide information processing capabilities in servers 12 and 14, respectively. As such, processors 22 and 36 may include one or more of a digital processor, an analog processor, a digital circuit designed to process information, an analog circuit designed to process information, a state machine and/or other mechanisms for electronically processing information. Although processors 22 and 36 are shown in FIG. 2 as a single entity in each server 12 and 14, this is for illustrative purposes only. In some implementations, processors 22 and 36 may include a plurality of processing units. These processing units may be physically located within the same device, or processors 22 and 36 may represent processing functionality of a plurality of devices operating in coordination. The processors 22 and 26 may be configured to execute components 24, 26, 28, 30, 32, 37, 40, 42 and/or other components. Processors 22 and 36 may be configured to execute components 24, 26, 28, 30, 32, 37, 40, 42 and/or other components by software, hardware, firmware, some combination of software, hardware and/or firmware and/or other mechanisms for configuring processing capabilities on processor 22 and 36.

It should be appreciated that although components 24, 26, 28, 30, 32, 37, 40, 42 and/or other components are illustrated in FIG. 2 as being co-located within processing units 22 and 36, in implementations in which processors 22 and 36 include multiple processing units, one or more of components 24, 26, 28, 30, 32, 37, 40, 42 and/or other components may be located remotely from the other components. The description of the functionality provided by the different components 24, 26, 28, 30, 32, 37, 40, 42 and/or other components described herein is for illustrative purposes, and is not intended to be limiting, as any of components 24, 26, 28, 30, 32, 37, 40, 42 and/or other components may provide more or less functionality than is described. For example, one or more of components 24, 26, 28, 30, 32, 37, 40, 42 and/or other components may be eliminated, and some or all of its functionality may be provided by other ones of components 24, 26, 28, 30, 32, 37, 40, 42 and/or other components. As another example, processors 22 and 36 may be configured to execute one or more additional components that may perform some or all of the functionality attributed below to one of components 24, 26, 28, 30, 32, 37, 40, 42 and/or other components.

Figure 5:
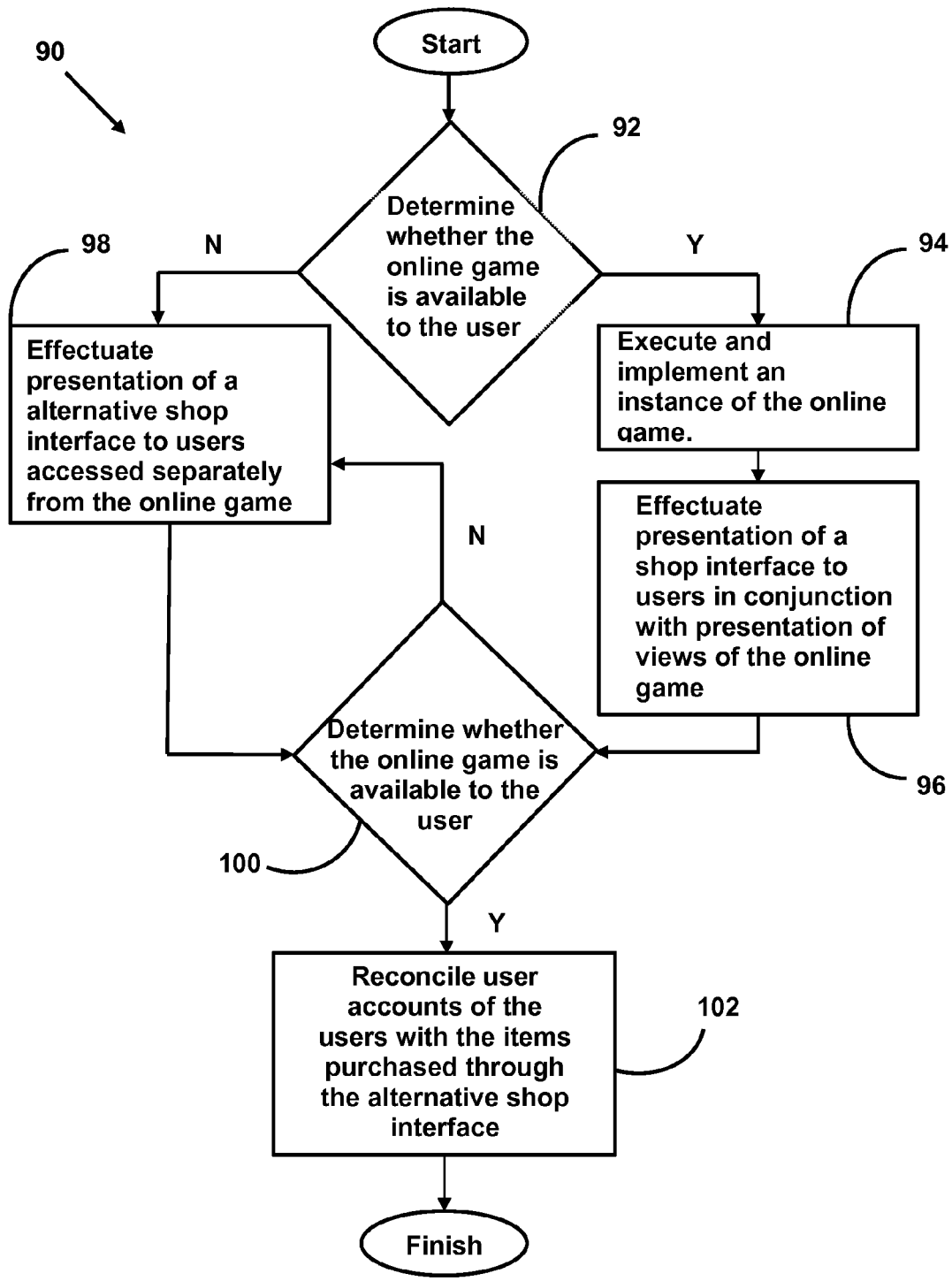
FIG. 5 illustrates a method for providing virtual items to users of a virtual world, in accordance with one or more implementations.

FIG. 5 illustrates a method 90 for providing virtual items to users of a virtual world. The operations of method 90 presented below are intended to be illustrative. In some embodiments, method 90 may be accomplished with one or more additional operations not described, and/or without one or more of the operations discussed. Additionally, the order in which the operations of method 90 are illustrated in FIG. 5 and described below is not intended to be limiting.

In some embodiments, method 90 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 90 in response to instructions stored electronically on an electronic storage medium. The one or more processing devices may include one or more devices configured through hardware, firmware and/or software to be specifically designed for execution of one or more of the operations of method xx.

At an operation 92 whether an online game is available to users may be determined. Such operations may be performed by a server status component, such as server status component 30 in accordance with some implementations.

At an operation 94 in response to a determination at operation 92 that the online game is available to users, an instance of the online game may be implemented. Such operations may be performed by a space component, such as space component 24, in accordance with some implementations.

At an operation 96 presentation of a shop interface to users may be effectuated in conjunction with presentation of views of the online game. Such operations may be performed by a shop component and/or a space component, such as shop component 28 and space component 24, in accordance with some implementations.

At an operation 98, in response to a determination at operation 92 that the online game is systematically unavailable to users, presentation of an alternative virtual shop interface accessed separately from the online game is effectuated. Such operations may be performed by an alternative shop component, such as alternative shop component 40, in accordance with some implementations.

At an operation 100 whether an online game is available to users may be determined. Such operations may be performed by a server status component, such as server status component 30, in accordance with some implementations.

At an operation 102, in response to a determination at operation 100 that the online game is available to users, the user accounts associated with the users of the online game are reconciled with the alternative user accounts associated with the users, such that the virtual items obtained by users through the alternative virtual shop interface become available to the users in the online game. Such operations may be performed by a merge component, such as merge component 32, in accordance with some implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for providing virtual items to users of a virtual world, the system comprising:
one or more physical processors configured by computer-readable instructions to:
execute an instance of an online game, and to facilitate participation of the users in the online game by effectuating transmission of information related to the instance of the online game to client computing platforms on which views of the online game are presented to the users;
effectuate presentation of a shop interface to users in conjunction with presentation of views of the online game, wherein the shop interface is configured to facilitate presentations to users of offers to sell virtual items usable within the game in exchange for an amount of currency;

detect if the online game is systematically unavailable to users; and, in response to detecting that the online game is presently systematically unavailable, effectuate presentation of an alternative virtual shop interface to users that is accessed over the Internet separately from the online game, wherein the alternative virtual shop interface presents to users offers to sell the virtual items usable within the game in exchange for less amounts of currency than the offers to sell the virtual items through the shop interface presented in conjunction with the online game.

2. The system of claim 1, wherein when the game is systematically unavailable to users the game has been purposefully made unavailable to users by an administrator.

3. The system of claim 1, wherein when the game is systematically unavailable the game has been made unavailable due to a malfunction of the system.

4. The system of claim 1, wherein the offers presented through the shop interface include a first offer to sell a first set of one or more virtual items for a first amount of currency, and wherein the offers presented through the alternative virtual shop interface include a second offer to sell the first set of one or more virtual items for a second amount of currency that is less than the first amount of currency.

5. The system of claim 1, wherein the virtual items purchased through the alternative virtual shop interface become available to a purchaser once the online game is no longer systematically unavailable.

6. The system of claim 1, wherein the one or more physical processors is further configured by computer-readable instructions to redirect the view presented on the client computing device and/or provide a link one the client computing device to the alternative virtual shop interface, in response to detecting that the game is systematically unavailable.

7. The system of claim 1, wherein the one or more physical processors is further configured by computer-readable instructions to facilitate entry and/or selection of one or more parameters associated with the one or more sets of virtual items, by an administrator.

8. The system of claim 7, wherein the one or more parameters may include the amount of currency associated with the virtual items.

9. The system of claim 1, wherein the virtual items include virtual currency usable in the virtual space by users.

10. The method of claim 1, wherein the virtual items include virtual currency usable in the online game by users.

11. A method for providing virtual items to users of a virtual world, the method performed by one or more physical processors, the method comprising:

executing an instance of an online game;

facilitating participation of the users in the online game by effectuating transmission of information related to the instance of the online game to client computing platforms on which views of the online game are presented to the users;

effectuating presentation of a shop interface to users in conjunction with presentation of views of the online game, wherein the shop interface is configured to facilitate presentations to users of offers to sell virtual items usable within the game in exchange for an amount of currency;

detecting if the online game is systematically unavailable to users; and, in response to detecting that the online game is presently systematically unavailable, effectuating presentation of an alternative virtual shop interface to users that is accessed over the Internet separately from the online game, wherein the alternative virtual shop interface presents to users offers to sell the virtual items usable within the game in exchange for less amounts of currency than the offers to sell the virtual items through the shop interface presented in conjunction with the online game.

12. The method of claim 11, wherein when the game is systematically unavailable to users the game has been purposefully made unavailable to users by an administrator.

13. The method of claim 11, wherein when the game is systematically unavailable the game has been made unavailable due to a malfunction.

14. The method of claim 11, wherein the offers presented through the shop interface include a first offer to sell a first set of one or more virtual items for a first amount of currency, and wherein the offers presented through the alternative virtual shop interface include a second offer to sell the first set of one or more virtual items for a second amount of currency that is less than the first amount of currency.

15. The method of claim 11, wherein the virtual items purchased through the alternative virtual shop interface become available to a purchaser once the online game is no longer systematically unavailable.

16. The method of claim 11, further comprising redirecting the view presented on the client computing device and/or providing a link on the client computing device to the alternative virtual shop interface, in response to detecting that the game is systematically unavailable.

17. The method of claim 11, further comprising facilitating entry and/or selection of one or more parameters associated with the one or more sets of virtual items, by an administrator.

18. The method of claim 17, wherein the one or more parameters may include the amount of currency associated with the virtual items.

* * * * *